United States Patent [19]

Egli

[11] Patent Number: 5,150,926
[45] Date of Patent: Sep. 29, 1992

[54] DOUBLE PIPE CONNECTION ON PLASTIC PIPES

[75] Inventor: Anton Egli, Rieden, Switzerland

[73] Assignees: Geberit AG, Switzerland; "Keramag" Keramischewerke AG, Fed. Rep. of Germany

[21] Appl. No.: 665,405

[22] Filed: Mar. 5, 1991

[30] Foreign Application Priority Data

Mar. 6, 1990 [CH] Switzerland .................... 716/90

[51] Int. Cl.⁵ ............................................. F16L 17/025
[52] U.S. Cl. ................................. 285/110; 285/137.1; 285/305; 285/379; 277/207 A; 277/208
[58] Field of Search .............. 285/137.1, 379, 305, 285/110, 153, 154; 277/207 A, 207 R, 208, 202

[56] References Cited

U.S. PATENT DOCUMENTS

| | | | |
|---|---|---|---|
| 2,422,060 | 6/1947 | Wotring | 285/8 |
| 3,469,863 | 9/1969 | Riester et al. | 285/137.1 |
| 3,583,710 | 6/1971 | Burelle | 285/137.1 X |
| 3,693,664 | 9/1972 | Schmunk | 285/137.1 X |
| 3,764,151 | 10/1973 | Elder | 285/137.1 |
| 3,948,315 | 4/1976 | Powell | 285/110 X |
| 3,967,643 | 7/1976 | Lutinger | 285/8 X |
| 4,102,544 | 7/1978 | Goodlaxon | 285/8 |
| 4,865,354 | 9/1989 | Allen | 285/110 X |
| 4,969,666 | 11/1990 | McMillen et al. | 285/8 |

FOREIGN PATENT DOCUMENTS

| | | | |
|---|---|---|---|
| 1962886 | 7/1970 | Fed. Rep. of Germany | 285/137.1 |
| 2129133 | 1/1972 | Fed. Rep. of Germany | 285/137.1 |
| 2304658 | 8/1973 | Fed. Rep. of Germany | 285/137.1 |
| 3529392 | 2/1987 | Fed. Rep. of Germany | 285/26 |
| 1284278 | 1/1962 | France | 285/137.1 |
| 1523311 | 3/1968 | France | |
| 782590 | 8/1957 | United Kingdom | 285/8 |
| 1219766 | 1/1971 | United Kingdom | 285/137.1 |
| 1355140 | 5/1974 | United Kingdom | 285/137.1 |

Primary Examiner—Randolph A. Reese
Assistant Examiner—Heather Chun
Attorney, Agent, or Firm—McGlew & Tuttle

[57] ABSTRACT

A double pipe connection is provided having a one-piece gasket (5), which extends sealingly into an intermediate space (1c) of one pipe end (1a) with an internal, transversely extending wall (5c), on one hand, and, also sealingly surrounds a partition (2c) of the other pipe end (2a), on the other hand. The two pipe ends (1a and 2a) are inserted into each other in the axial direction, and are held together with a locking bar (6) in a positive-locking manner. The cross section of the pipe connection may be non-round, e.g., rectangular. Since the pipe ends have no flanges and outer threads, they may be cut to any length, and shaping suitable for injection molding is possible. The double pipe connection is particularly suitable for liquid-bearing pipes on sanitary devices, e.g., drain fittings for wash stands.

11 Claims, 2 Drawing Sheets

DOUBLE PIPE CONNECTION ON PLASTIC PIPES

The present invention relates in general to a double pipe connection and in particular to a new and useful pipe connection for pipes of different diameter which are connected in a sealing manner.

BACKGROUND OF THE INVENTION

A double pipe connection, in which the two pipe ends have outer flanges and outer threads and are held together with a union nut, has been known in the prior art. Such a double pipe connection is known on a wash basin, wherein one pipe is an overflow pipe and the other pipe is a connection piece on the drain pipe.

SUMMARY OF THE INVENTION

It is a primary object of the present invention to provide a connection of the above-mentioned class, which can be manufactured especially according to the injection molding process and installed in a simpler manner, and which guarantees satisfactory sealing between the two channels in the connection zone. The connection shall be suitable especially for water-bearing pipes on sanitary devices.

The invention provides a means for connecting an inner pipe having two channels to an outer pipe having two channels. The inner pipe includes a separation between the channels A gasket for connecting the inner pipe to the outer pipe extends between the two channels of the inner pipe.

Since the pipe ends in the connection according to the present invention have no threads or flanges, the pipes can be manufactured according to the injection molding process in a substantially simpler manner. The pipe ends do not need to have a round cross section, so that they may even be flat to achieve a favorable adaptation to the space conditions. To establish the connection, the two pipe ends need only be pushed together, and the gasket extends between the two separate channels.

Since the pipe ends have no flanges, they may be cut to any length. This is extremely advantageous especially in sanitary installations, and it also simplifies the stocking of spare parts.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 5:
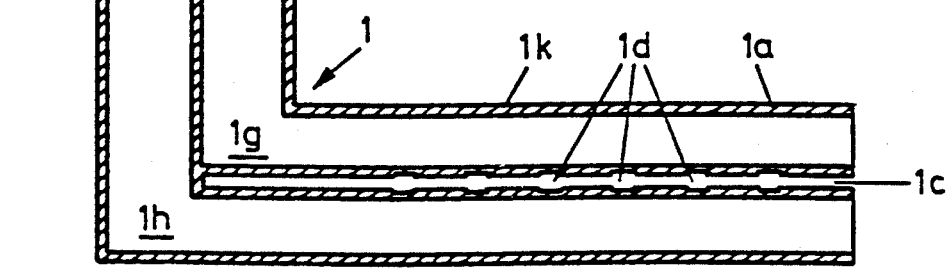
FIG. 5 is a longitudinal sectional view taken along the line V—V of FIG. 4.
Figure 4:
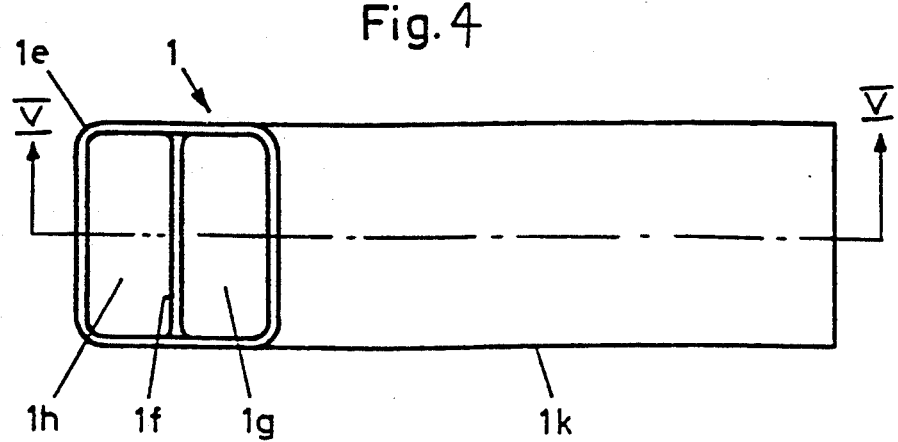
FIG. 4 is a top view of an overflow pipe according to the invention.

Referring now to the drawings, an inner pipe or overflow pipe generally designated by 1 is connected to an outer pipe or drainpipe generally designated 2. The overflow pipe 1 is arranged under a washing stand (not shown), and has two channels $1g$ and $1h$. Channel $1g$, forms the rising channel, and channel $1h$ forms the return channel, which leads into an elbow trap 3 under a valve (not shown). As is shown in FIG. 5, the overflow pipe 1 is bent at right angles, and a vertically ascending section $1e$ is subdivided on the inside by a partition $1f$ in the usual manner. In the other, horizontally extending section $1k$, the two channels $1g$ and $1h$ are separated by an intermediate space $1c$.

Figure 1:
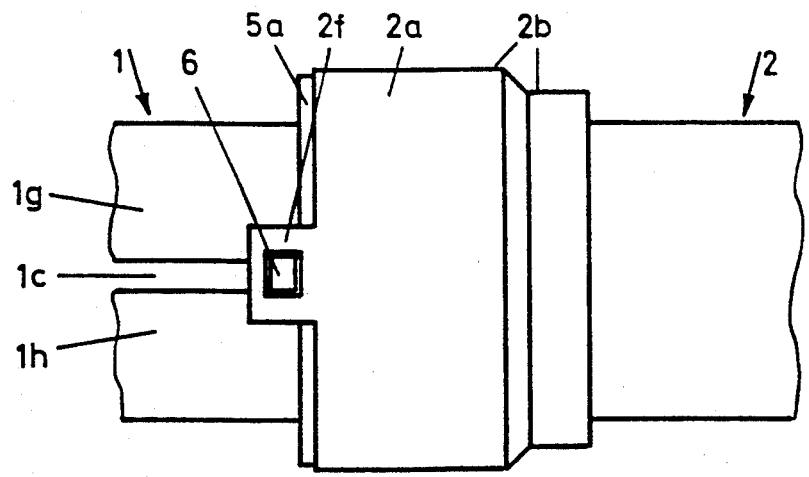
FIG. 1 is an elevational view of a double pipe connection according to the present invention.

In this embodiment, pipe 2 is a drain pipe connection of a drain pipe, which is connected to the elbow trap 3 by means of a union nut 4 at the bottom and to a drain valve (not shown here) at the top. The pipe 2 is subdivided by an inner wall $2c$ made in one piece with it into two separate channels $2d$ and $2e$. As is shown in FIGS. 1 and 2, the free end $2a$ of the pipe 2 is expanded in steps $2b$ on the inside and outside such that it is able to receive a gasket 5 as well as the pipe end $1a$ in its inner space.

Figure 2:
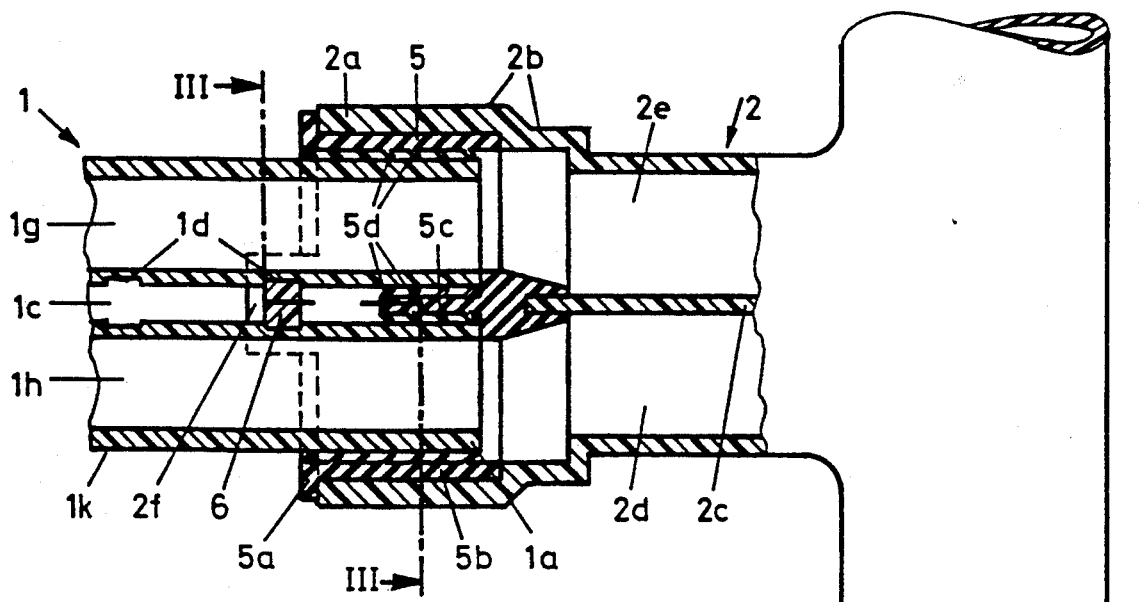
FIG. 2 is an elevational sectional view of the double pipe connection according to the present invention on a drain of a wash basin.
Figure 2:
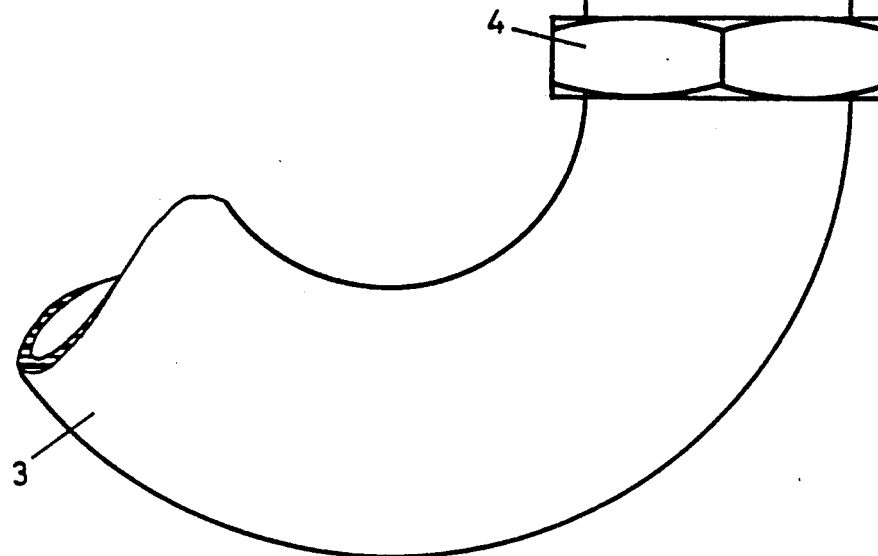

When the pipes 1 and 2 are inserted into each other axially as shown in FIG. 2, the channels $2e$ and $1g$, as well as the channels $2d$ and $1h$ are sealed against each other in a liquid-tight manner in the zone of the connection. The gasket 5 provided for this purpose consists of an elastic material and is inserted into the end $2e$ of the pipe 2 until it comes into contact with a flange-like edge $5a$. A circumferential wall $5b$ is in sealing contact with the inside of the pipe end $2a$. A wall $5c$, which extends into the intermediate space $1c$, on one end, and sealingly surrounds the wall $2c$, on the other end, is made in one piece with the wall $2b$. Elastic sealing lips $5d$, which are in a sealing contact with the outside of the pipe end $1a$ under elastic tension, are made in one piece with the insides of the walls $5b$ and $5c$. The sealing lips $5d$ also ensure a certain frictional connection between the two pipes and is also able to absorb variations in dimensions on these pipes.

Figure 3:
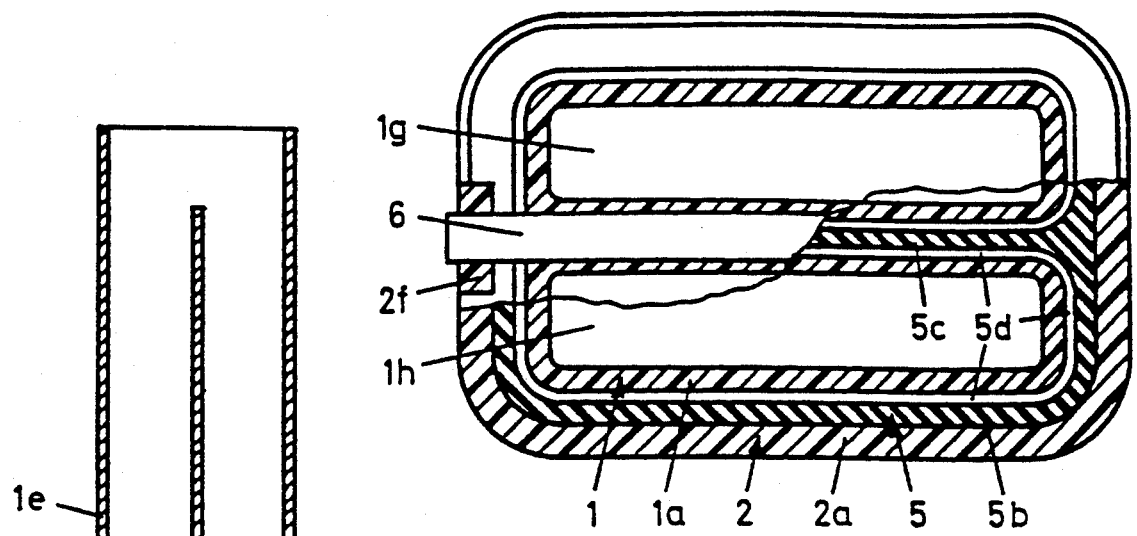
FIG. 3 is a sectional view taken along the line III—III in FIG. 2.

As shown in FIG. 3, the pipe ends $1a$ and $2a$, as well as the gasket 5 are of rectangular cross section. Therefore, at equal flow cross section, the height of the connection may be smaller compared with a double pipe connection with round cross section. Such a free selection of the cross section is particularly advantageous in the case of crowded space conditions, which are frequently encountered in sanitary devices.

A locking bar 6, which is pushed into the intermediate space $1c$ and extends with its ends into diagonally opposite extension pieces having recesses or straps $2f$ of the pipe end $2a$, is provided to fix the two pipes 1 and 2 in the axial direction. Between its ends, the locking bar 6 is inserted into grooves $1d$ of the pipe end $1a$, so that the locking bar 6 connects the two ends $1a$ and $2a$ in a positive-locking manner. According to FIGS. 5 and 2, a plurality of such grooves are preferably provided, so that such grooves $1d$ are available even after the end $1a$ has been cut off.

Thus, to establish the connection, it is only necessary to put together the pipes 1 and 2, and push in the locking bar 6.

While a specific embodiment of the invention has been shown and described in detail to illustrate the application of the principles of the invention, it will be understood that the invention may be embodied otherwise without departing from such principles.

What is claimed is:

1. A double pipe connection for connecting pipes comprising:
    a one piece outer double pipe being divided into two channels;
    an inner pipe having two channels fixedly connected to one another and, said inner pipe channels having an intermediate space therebetween;
    a gasket fittable inside said outer pipe, said gasket having a partition, said gasket partition extending into said intermediate space, said outer double pipe is divided by an inner wall, said gasket having a circumferential wall being in sealing contact with the inside of the outer pipe and being in sealing contact with the outside of the inner pipe, said gasket partition having one end defining a cavity, said outer double pipe inner wall extending into said gasket partition cavity.

2. A double pipe connection according to claim 1, wherein:
    said inner pipe channels have a contacting surfaces at said intermediate space, said gasket partition being in sealing contact with said contact surfaces.

3. A double pipe connection according to claim 1, wherein:
    said circumferential wall and said partition have sealing lips being in contact with the outside of the inner pipe.

4. A pipe connection, comprising:
    a first pipe having two channels separated by an intermediate space;
    a one piece second pipe being divided into two channels by an inner wall;
    a gasket having a circumferential wall and a partition, said gasket circumferential wall being fittable over said first pipe and said partition being fittable into said intermediate space, said gasket partition having a forward end defining a cavity, said inner wall extending into said cavity, said circumferential wall being fittable into said second pipe.

5. A double pipe connection for connecting pipes comprising:
    an outer pipe;
    an inner pipe having two channels, said inner pipe channels having an intermediate space therebetween;
    a gasket fittable inside said outer pipe, said gasket having a partition, said gasket partition extending into said intermediate space;
    a locking bar, said locking bar being inserted into said intermediate space and being attached to said outer pipe thereby fixedly connecting said inner pipe to said outer pipe.

6. A double pipe connection according to claim 5, wherein:
    said outer pipe includes two diagonally opposite extension pieces having recesses, said locking bar having ends which extend into said extension pieces recesses.

7. A pipe connection according to claim 5, wherein:
    said outer pipe is stepwise expanded toward its opening.

8. A pipe connection according to claim 5, wherein:
    said inner pipe end and said outer pipe end have rectangular cross sections.

9. A pipe connection according to claim 5, wherein:
    said inner pipe is a connection piece of a sanitary device drain fitting.

10. A pipe connection according to claim 9, wherein:
    said sanitary device is a wash basin.

11. A pipe connection according to claim 10, wherein:
    said inner pipe is an overflow pipe a first of said inner pipe channels being arranged above a second of said channels being a return channel, each of said inner pipe channels having a horizontal portion adjacent said outer pipe and a vertical section connected to said horizontal section, said rising channel vertical section being open to said return channel vertical section at an upper end.

* * * * *